Dec. 24, 1935.　　　　　L. W. DYER　　　　　2,025,653

CIRCUIT BREAKER APPARATUS

Filed Aug. 15, 1934

WITNESSES:
Fred C. Wilham
Ralph H. Swingle

INVENTOR
Lloyd W. Dyer
BY
F. W. Lyle
ATTORNEY

Patented Dec. 24, 1935

2,025,653

UNITED STATES PATENT OFFICE 2,025,653

CIRCUIT BREAKER APPARATUS

Lloyd W. Dyer, Swissvale, Pa., assignor to Westinghouse Electric & Manufacturing Company, East Pittsburgh, Pa., a corporation of Pennsylvania Application August 15, 1934, Serial No. 739,920

5 Claims. (Cl. 171—97)

This invention relates to change-over switches such as are used in circuits where two sources of electrical energy are provided for supplying a single load circuit.

Two sources of electrical supply are often provided for buildings or other applications where a high degree of service reliability is required. The load is normally connected to one source of supply, and a circuit interrupter is arranged to disconnect the load from this preferred source of supply if it should fail for any reason, and to automatically connect the load to the second or emergency source of supply. When the condition, which caused the preferred source of supply to fail, has been remedied and voltage is restored thereto, the circuit interrupter is arranged to automatically switch the load circuit from the emergency source back to the preferred source.

An object of the invention is to provide a change-over switch which is entirely automatic and electrically operated so that periodic inspection and maintenance is not necessary in order to see that springs are kept wound to supply energy for performing the switching operations.

Another object of the invention is to provide an operating mechanism for a change-over switch which makes use of only a single solenoid operable by electrical energy in one direction only, to supply the energy for performing both the change-over from the preferred source to the emergency source and to make the return operation from the emergency source to the preferred source. This provides a simple and inexpensive structure, since no electric motor, worm gear drive or complicated control equipment are required.

A further object of the invention is to provide a simplified control circuit for making the change-over and return operations of the circuit interrupter. The control circuits are all energized from the preferred source only so that only one transformer is necessary, rather than to use a transformer on both the preferred source and the emergency source. This is accomplished due to the fact that no electrical power need be applied to the operating mechanism in order to perform the switching operation from the preferred source to the emergency source since a spring is used to make the change-over. The spring is normally restrained by an undervoltage device which releases the spring to actuate the circuit interrupter upon a decrease in voltage. It should be noted that even the control circuit requires no electrical energization, since it operates upon a failure of voltage. The solenoid is energized electrically only during the switching operation which returns the connection of the load circuit from the emergency source to the preferred source. This operation of the solenoid stresses the biasing spring, which is then ready to make the change-over from the preferred source to the emergency source upon failure of the preferred source without any supply of electrical energy either to the solenoid or its associated control circuit.

A further object of my invention is to provide a change-over switch and an operating mechanism therefor which may be assembled entirely from standard apparatus, thus avoiding expensive special apparatus. In one preferred modification of the invention, two standard oil circuit breakers are used. These circuit breakers are connected to a common operating shaft so that when one breaker opens, the other breaker closes. The common operating shaft for both breakers is actuated by a standard solenoid operating mechanism which is provided with a standard under-voltage trip attachment. The only other control apparatus needed is a standard auxiliary switch connected to the operating mechanism and a standard relay.

Other objects and advantages of the invention will be apparent from the further description of the specific modification illustrated in the drawing, wherein.

Figure 1:
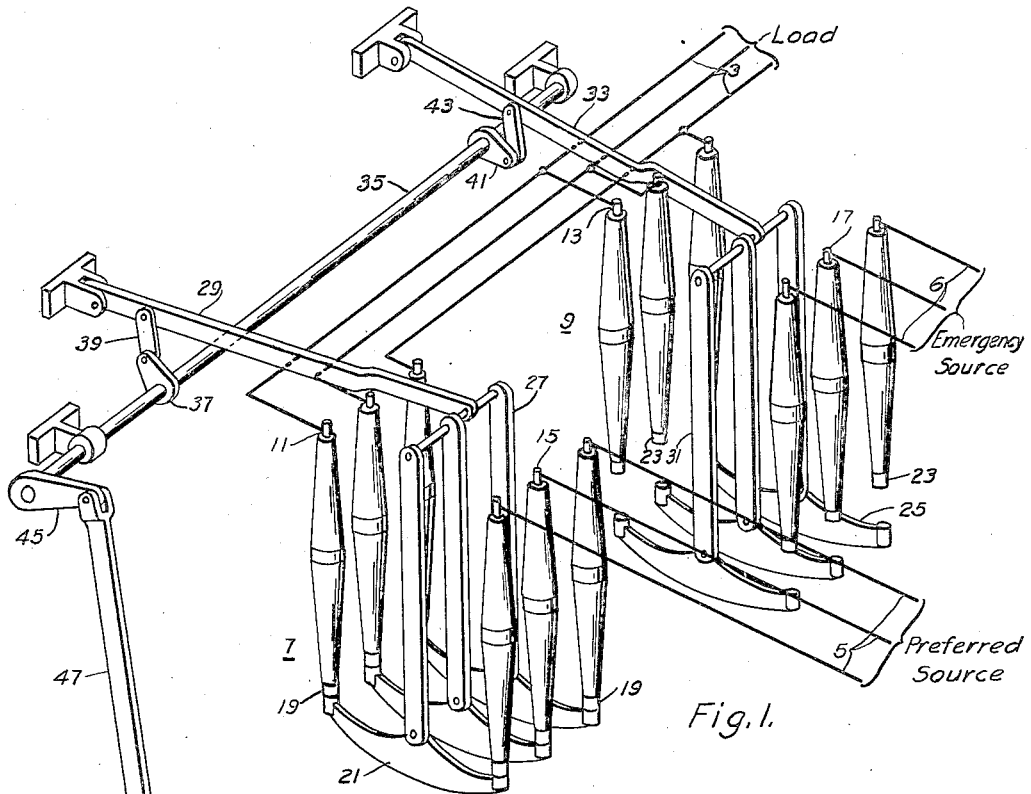
Figure 1 is a diagrammatic view of the apparatus of my invention.

In order to provide for connecting the load circuit 3 to either the preferred source of electrical energy 5 or the emergency source 6, two circuit breakers 7 and 9 of the oil-circuit-breaker type are provided. The load circuit 3 is connected both to the terminal studs 11 of the breaker 7 and to terminal studs 13 of the breaker 9. The preferred source 5 is connected to the other terminal studs 15 of the breaker 7, and the emergency source 6 is connected to the terminal studs 17 of the breaker 9. The stationary contacts 19 of the breaker 7 in the preferred circuits are bridged across by conducting bridging bars 21, and the stationary contacts 23 of the breaker 9 in the emergency circuit are bridged across by bridging bars 25. The bridging bars of the breaker 7 are actuated through lift rods 27 of insulating material and an operating arm 29. The circuit breaker 9 is similarly operated through lift rods 31 and an operating arm 33. An operating shaft 35 extends across both of the circuit breakers 7 and 9, and provides a common operating shaft for both breakers. The operating arm 29 of breaker 7 is actuated from the shaft 35 by a crank 37, which is fixed to the shaft 35, and an operating link 39. The operating arm 33 of breaker 9 is actuated through a crank 41 fixed to the shaft 35 and a link 43. The cranks 37 and 41 are positioned on opposite sides of the common operating shaft 35, so that rotation of the shaft 35 in one direction opens the contacts of one breaker at the same time that it closes the contacts of the other breaker. The common operating shaft 35 is connected through a crank 45 and link 47 to the operating mechanism 49.

Figure 2:
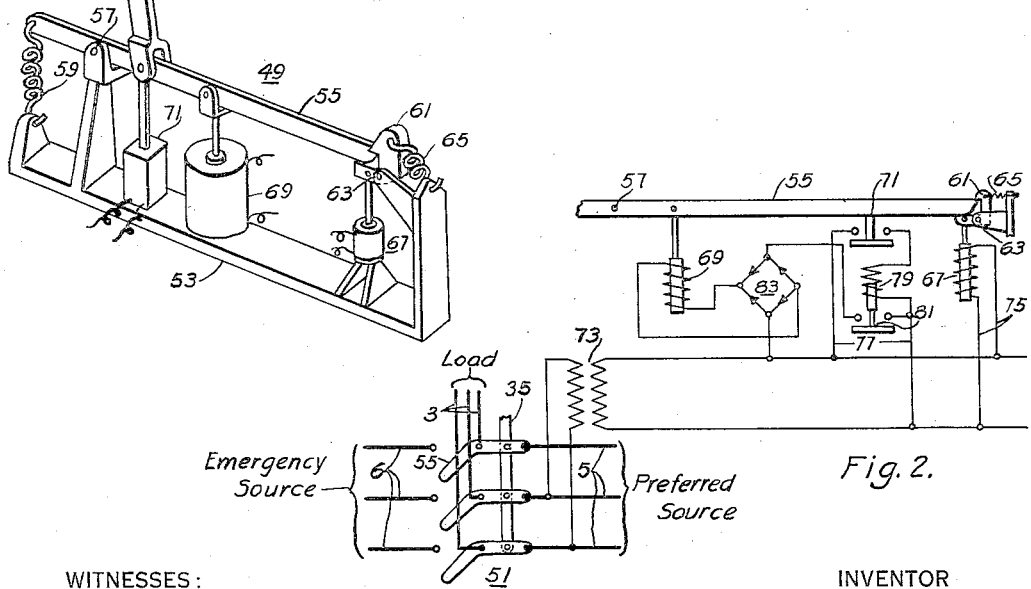
Fig. 2 is a wiring diagram showing the electrical connections of the control for the operating mechanism.

While the switching device has been illustrated as comprising a pair of double-break oil circuit breakers having a common actuating shaft for opening one breaker when the other breaker closes, it is understood that other switching means, such as the double-throw switch 51 illustrated in Fig. 2 of the drawing, may be used.

The operating mechanism 49 comprises a base 53 having an operating lever 55 pivoted thereon at the point 57. A main spring 59 biases the operating lever 55 to move counter-clockwise so as to open the circuit breaker connecting the load to the preferred source 5 and to close the circuit breaker 9 and connect the load circuit to the emergency source 6. The operating lever 55 is restrained from movement by the biasing spring 59 by means of a pivoted latch 61. The pivot point 63 of the latch is substantially in line with the point of engagement of the end of the operating lever 55 with the nose of the latch, so that the latch would normally retain the operating lever 55 from movement. A biasing spring 65 is provided for biasing the pivoted latch 61 to unlatched position. The pivoted latch 61 is prevented from moving to unlatched position by an under-voltage coil 67 which holds the latch 61 from movement by the spring 65 until there has been a predetermined decrease in the voltage supplied to the coil.

After the operating mechanism has moved under action of the main spring 59 to connect the load to the emergency source, the return operation is made by means of a main operating solenoid 69 which rotates the operating lever 55 about its pivot point 57 so as to open circuit breaker 9 and close circuit breaker 7, and to also store energy in the main spring 59. An auxiliary switch 71 is connected to be actuated upon each movement of the operating lever 55 in order to provide for the necessary electrical control of the operating mechanism.

In Fig. 2, where the control circuit for the apparatus is shown, the same reference numerals are used as in Fig. 1. The load circuit 3 may be connected to either the preferred source of supply 5 or the emergency source of supply 6 by actuation of the common operating shaft 35 through movement of the pivoted operated lever 55. Where the source of supply is at a high voltage, the control circuit is energized through a transformer 73, which is connected to the preferred source of supply 5. It should be noted that there are no electrical connections between the control circuit and the emergency source 6, thus making it unnecessary to provide an additional current transformer for connection to the emergency source. The under-voltage coil 67 is connected directly across the current transformer 73 through conductors 75. The under-voltage coil is, therefore, directly responsive to a failure or a decrease in the voltage of the preferred source.

When the voltage of the preferred source has decreased to a predetermined value, the holding action of the under-voltage trip coil 67 is insufficient to overcome the spring 65, which then draws back the pivoted latch 61 and allows the operating arm 55 to be moved by the main spring 59 and actuate the common operating shaft 35 to disconnect the load circuit from the preferred source of supply 5 and connect it to the emergency source of supply 6. When the operating lever 55 moves counter-clockwise about its pivot 57 to change-over the connection, the contacts of the auxiliary switch 71 are closed. This completes the circuit of relay 79 through conductors 77 to the transformer 73. The relay 79 is of the over-voltage type so that when the voltage has increased again to a predetermined value, the contacts 81 of the relay are closed. This completes the circuit from the transformer 73 through a full-wave rectifier 83 to the main operating solenoid 69 which rotates the operating lever 55 in a clockwise direction about its pivot point 57 to return the connection of the load circuit from the emergency source to the preferred source.

The rectifier 83 is provided where the preferred source supplies alternating current, since it is more satisfactory to energize the main operating solenoid with direct current. The rectifier is preferably of the dry-plate type, such as a stack of copper-oxide discs. When the operating lever 55 has been moved to latched position and is held by the latch 61 against the bias of the main spring 59, the contacts 71 of the auxiliary switch are opened, thus opening the holding circuit of relay 79 and deenergizing the closing solenoid 69. The voltage at which the relay 79 is closed is slightly higher than the voltage at which the under-voltage coil 67 is released, so that when the voltage has been restored to such a value as to actuate the relay 79 the under-voltage coil 67 is energized sufficiently to retain the latch in latched position.

It is thus seen that the load circuit is normally connected to the preferred source until such time that the voltage of the preferred source has decreased to such a value that the holding coil 67 releases the latch 61 and permits the main biasing spring 59 to change over the connection from the preferred source to the emergency source. This change-over is made without any supply of electrical energy to either the solenoid or to the control circuit, which requires only a decrease in voltage to cause it to operate.

As soon as the load circuit has been transferred from the preferred source to the emergency source, the relay 79 completes the circuit of the over-voltage relay, and as soon as a predetermined voltage has been restored to the preferred source, the over-voltage relay energizes the solenoid from the preferred source to return the connection of the load circuit from the emergency source to the preferred source. At the same time that this return operation takes place, the main spring 59 is stressed and thereby stores energy which is available for making the change-over if the voltage should again fail on the preferred source.

It is thus seen that this invention provides a simple operating mechanism and control circuit for a changeover switch, since only a single solenoid provided with an under-voltage relay and an over-voltage relay are needed to make both the change-over and the return operation. The holding circuit is arranged so that electrical power need be supplied only from the preferred source, thus eliminating any electrical connections to the emergency source. The mechanism is also of a simple type which is inexpensive and not likely to get out of order.

While a specific form of the invention has been illustrated, it is obvious that various changes and modifications may be made without departing from the spirit of the invention as set forth in the following claims.

I claim as my invention:

1. In electrical apparatus, a load circuit, a pair of supply circuits, switching means for normally connecting said load circuit to one of said supply circuits, means for biasing said switching means to change over said connection to the other supply circuit, latching means held in latched position by an under-voltage coil for restraining said biasing means until there has been a predetermined decrease in the voltage of the first supply circuit and then releasing said biasing means to change over said connection to the second supply circuit, a solenoid operable to return said connection to the first supply circuit, and a relay responsive to the restoration of a predetermined voltage in the first supply circuit for energizing said solenoid from said first supply circuit.

2. In electrical apparatus, a first and a second electrical circuit, switching means operable to open the first circuit and close the second circuit upon one actuation thereof and to close the first circuit and open the second circuit upon another actuation thereof, means for biasing said switching means to move to open the first circuit and close the second circuit, means restraining said biasing means from moving said switching means, means responsive to a condition in one of said circuits for causing said restraining means to permit said biasing means to move said switching means to open the first circuit and close the second circuit, power-operated means for moving said switching means to close the first circuit and open the second circuit, means responsive to a second condition in one of said circuits for connecting said power-operated means to be energized, said power-operated means moving said switching means substantially immediately upon the energization thereof, and means for causing deenergization of said power-operated means as soon as said movement of the switching means is completed.

3. In a change-over switch, contact means movable to connect a load circuit to either one of two supply circuits, an operating mechanism for said contact means including an operating lever, biasing means for moving said operating lever in one direction, a solenoid for moving said operating lever in the other direction against said biasing means, retaining means for holding said operating lever in the position to which it has been moved by said solenoid against said biasing means, an undervoltage device for connection to one of said supply circuits for causing release of said retaining means and movement of said operating lever by said biasing means, and an overvoltage device energized from one of said supply circuits for connecting said solenoid to be energized and move said operating lever.

4. In a change-over switch, contact means movable to connect a load circuit to either one of two supply circuits, an operating mechanism for said contact means including an operating lever, biasing means for moving said operating lever in one direction, a solenoid for moving said operating lever in the other direction against said biasing means, retaining means for holding said operating lever in the position to which it has been moved by said solenoid against said biasing means, an under-voltage device for connection to one of said supply circuits for causing release of said retaining means and movement of said operating lever by said biasing means upon a predetermined decrease in voltage of said one supply circuit, an over-voltage device, means for connecting said over-voltage device to said one supply circuit upon the movement of said operating lever after release by said under-voltage device, said over-voltage device connecting said solenoid to be energized from said one supply circuit only after the restoration of a predetermined voltage to said one supply circuit to move said operating lever against said biasing means into position to be held by said retaining means.

5. In electrical apparatus, a first and a second electrical circuit, switching means operable to open the first circuit and close the second circuit upon one actuation thereof and to close the first circuit and open the second circuit upon another actuation thereof, means for biasing said switching means to move to open the first circuit and close the second circuit, means restraining said biasing means from moving said switching means, means connected to said first circuit and responsive to a condition therein for causing said restraining means to permit said biasing means to move said switching means to open said first circuit and close said second circuit, power-operated means for moving said switching means to close said first circuit and open said second circuit, means connected to said first circuit and responsive to a second condition therein for connecting said power-operated means to said first circuit only upon the occurrence of said second condition, said power-operated means when connected to said first circuit actuating said switching means against said biasing means, and means for disconnecting said power-operated means from said first circuit when said actuation of said switching means is completed.

LLOYD W. DYER.